United States Patent
Jou et al.

(10) Patent No.: US 8,416,725 B2
(45) Date of Patent: Apr. 9, 2013

(54) APPARATUS AND METHOD FOR TRANSMIT POWER SAVINGS

(75) Inventors: Yu-Cheun Jou, San Diego, CA (US);
Rashid Attar, San Diego, CA (US);
Mark Wallace, San Diego, CA (US);
Qiang Wu, San Diego, CA (US); Jun Ma, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 343 days.

(21) Appl. No.: 12/703,144

(22) Filed: Feb. 9, 2010

(65) Prior Publication Data

US 2010/0208639 A1    Aug. 19, 2010

Related U.S. Application Data

(60) Provisional application No. 61/152,932, filed on Feb. 16, 2009.

(51) Int. Cl.
*G08C 17/00*    (2006.01)

(52) U.S. Cl.
USPC ........................................................ 370/311

(58) Field of Classification Search ........................ None
See application file for complete search history.

(56) References Cited

U.S. PATENT DOCUMENTS

| 7,792,074 B2 | 9/2010 | Chen et al. |
| 2003/0193915 A1* | 10/2003 | Lee et al. ...................... 370/335 |
| 2010/0202501 A1* | 8/2010 | Yang et al. .................... 375/219 |

FOREIGN PATENT DOCUMENTS

| JP | 2004531937 | 10/2004 |
| JP | 2009021996 | 1/2009 |
| WO | WO0035126 | 6/2000 |
| WO | WO0074292 | 12/2000 |

\* cited by examiner

*Primary Examiner* — Chi Pham
*Assistant Examiner* — Kouroush Mohebbi
(74) *Attorney, Agent, or Firm* — Qualcomm Patent Group; Stanton Braden; James H. Yancey, Jr.

(57) ABSTRACT

An apparatus and method for transmit power savings comprising determining a rate of a previous frame; determining if a current frame is an ALWAYS-ON frame, wherein the current frame temporally succeeds the previous frame; and either ignoring every other reverse link power control (RLPC) bits received on a forward power control subchannel (F-PCSCH) or applying every RLPC bits received on the F-PCSCH. In one aspect, the apparatus and method for transmit power savings comprising using a rate determination algorithm (RDA) to determine a rate of a previous frame; detecting a pilot gating pattern at the end of the previous frame; comparing the rate of the previous frame to a threshold; determining if a current frame is an ALWAYS-ON frame; and declaring the current frame to be a 0 bps frame and puncturing the F-PCSCH to a predetermined frequency.

29 Claims, 10 Drawing Sheets

US 8,416,725 B2

APPARATUS AND METHOD FOR TRANSMIT POWER SAVINGS

CLAIM OF PRIORITY UNDER 35 U.S.C. §119

The present Application for Patent claims priority to Provisional Application No. 61/152,932 entitled Method and Apparatus for Transmit Power Savings filed Feb. 16, 2009, and assigned to the assignee hereof and hereby expressly incorporated by reference herein.

FIELD

This disclosure relates generally to apparatus and methods for transmit power savings in a wireless communication system. More particularly, the disclosure relates to transmit power savings for forward link power control subchannel in CDMA2000 1x wireless systems.

BACKGROUND

In the CDMA2000 1x Rev. E specification, the reverse-link power control bits are transmitted at 400 Hz on the forward link. The power control bits are carried by the forward power control subchannel (F-PCSCH), which is time division multiplexed with the forward fundamental channel (F-FCH). In order to ensure that the power control bits are properly demodulated, no matter what rate the F-FCH transmits, the power control bits are always transmitted at the same power level as the full-rate (9600 bps) traffic channel. In addition, to overcome other sector interference(s), the transmit power of the power control bits has to be boosted according to the active set size of the mobile station (MS). For example, if a MS has an active set size of 2, the transmit power of the F-PCSCH from both sectors in its active set has to be increased by 3 dB. Thus the reverse link power control (RLPC) bit transmitted on the forward link of CDMA2000 1x consumes a significant portion of the forward link transmission power. In typical deployment, over 20% of the total forward link power transmitted from a sector is spent on the F-PCSCH.

SUMMARY

Disclosed is an apparatus and method for transmit power savings. According to one aspect, a method for facilitating base station transmit power savings comprising determining a rate of a previous frame; determining if a current frame is an ALWAYS-ON frame, wherein the current frame temporally succeeds the previous frame; and performing one of the following: a) ignore every other reverse link power control (RLPC) bits received on a forward power control subchannel (F-PCSCH) or b) apply every reverse link power control (RLPC) bits received on the forward power control subchannel (F-PCSCH).

According to another aspect, a method for transmit power savings at a base transceiver station comprising using a rate determination algorithm (RDA) to determine a rate of a previous frame; detecting a pilot gating pattern at the end of the previous frame; comparing the rate of the previous frame to a threshold; determining if a current frame is an ALWAYS-ON frame; and declaring the current frame to be a 0 bps frame and puncturing the forward power control subchannel (F-PCSCH) to a predetermined frequency.

According to another aspect, an apparatus for facilitating base station transmit power savings comprising a processor and a memory, the memory containing program code executable by the processor for performing the following: determining a rate of a previous frame; determining if a current frame is an ALWAYS-ON frame, wherein the current frame temporally succeeds the previous frame; and performing one of the following: a) ignore every other reverse link power control (RLPC) bits received on a forward power control subchannel (F-PCSCH) or b) apply every reverse link power control (RLPC) bits received on the forward power control subchannel (F-PCSCH).

According to another aspect, a base transceiver station for transmit power savings comprising a processor and a memory, the memory containing program code executable by the processor for performing the following: using a rate determination algorithm (RDA) to determine a rate of a previous frame; detecting a pilot gating pattern at the end of the previous frame; comparing the rate of the previous frame to a threshold; determining if a current frame is an ALWAYS-ON frame; and declaring the current frame to be a 0 bps frame and puncturing the forward power control subchannel (F-PCSCH) to a predetermined frequency.

According to another aspect, an apparatus for facilitating base station transmit power savings comprising means for determining a rate of a previous frame; means for determining if a current frame is an ALWAYS-ON frame, wherein the current frame temporally succeeds the previous frame; and means for performing one of the following: a) ignore every other reverse link power control (RLPC) bits received on a forward power control subchannel (F-PCSCH) or b) apply every reverse link power control (RLPC) bits received on the forward power control subchannel (F-PCSCH).

According to another aspect, a base transceiver station for transmit power savings comprising means for using a rate determination algorithm (RDA) to determine a rate of a previous frame; means for detecting a pilot gating pattern at the end of the previous frame; means for comparing the rate of the previous frame to a threshold; means for determining if a current frame is an ALWAYS-ON frame; and means for declaring the current frame to be a 0 bps frame and puncturing the forward power control subchannel (F-PCSCH) to a predetermined frequency.

According to another aspect, a computer-readable medium storing a computer program, wherein execution of the computer program is for: determining a rate of a previous frame; determining if a current frame is an ALWAYS-ON frame, wherein the current frame temporally succeeds the previous frame; and performing one of the following: a) ignore every other reverse link power control (RLPC) bits received on a forward power control subchannel (F-PCSCH) or b) apply every reverse link power control (RLPC) bits received on the forward power control subchannel (F-PCSCH).

According to another aspect, a computer-readable medium storing a computer program, wherein execution of the computer program is for: using a rate determination algorithm (RDA) to determine a rate of a previous frame; detecting a pilot gating pattern at the end of the previous frame; comparing the rate of the previous frame to a threshold; determining if a current frame is an ALWAYS-ON frame; and declaring the current frame to be a 0 bps frame and puncturing the forward power control subchannel (F-PCSCH) to a predetermined frequency.

An advantage of the present disclosure may include saving transmit power on the forward link.

It is understood that other aspects will become readily apparent to those skilled in the art from the following detailed description, wherein it is shown and described various aspects

DETAILED DESCRIPTION

Figure 1:
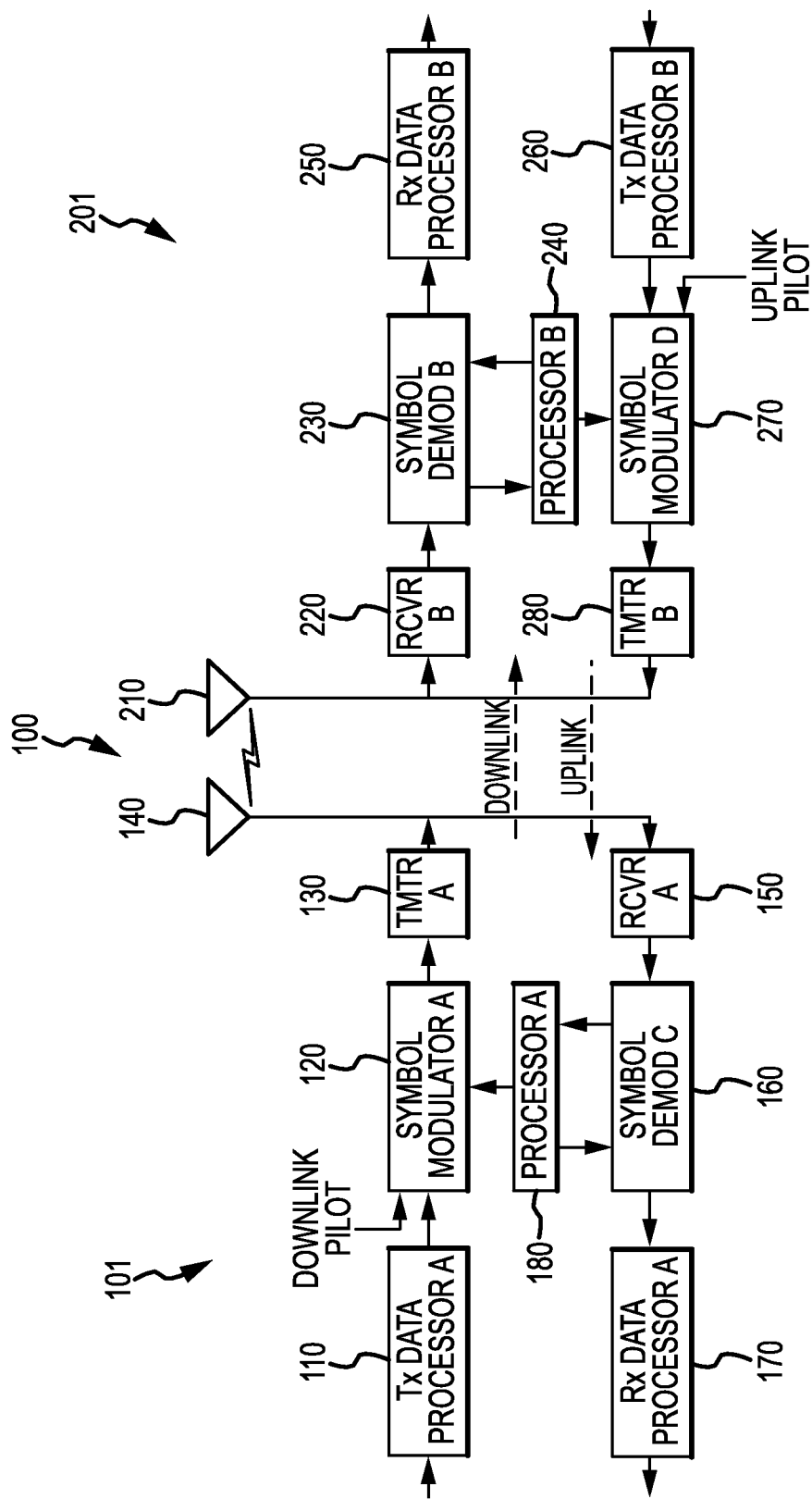
FIG. 1 is a block diagram illustrating an example of a two terminal system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment or any other suitable wireless environment.

In one aspect, the two terminal system 100 includes an access node 101 (e.g., base station or Node B) and a user equipment or UE 201 (e.g., user device). In the downlink leg, the access node 101 (e.g., base station or Node B) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station or Node B) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
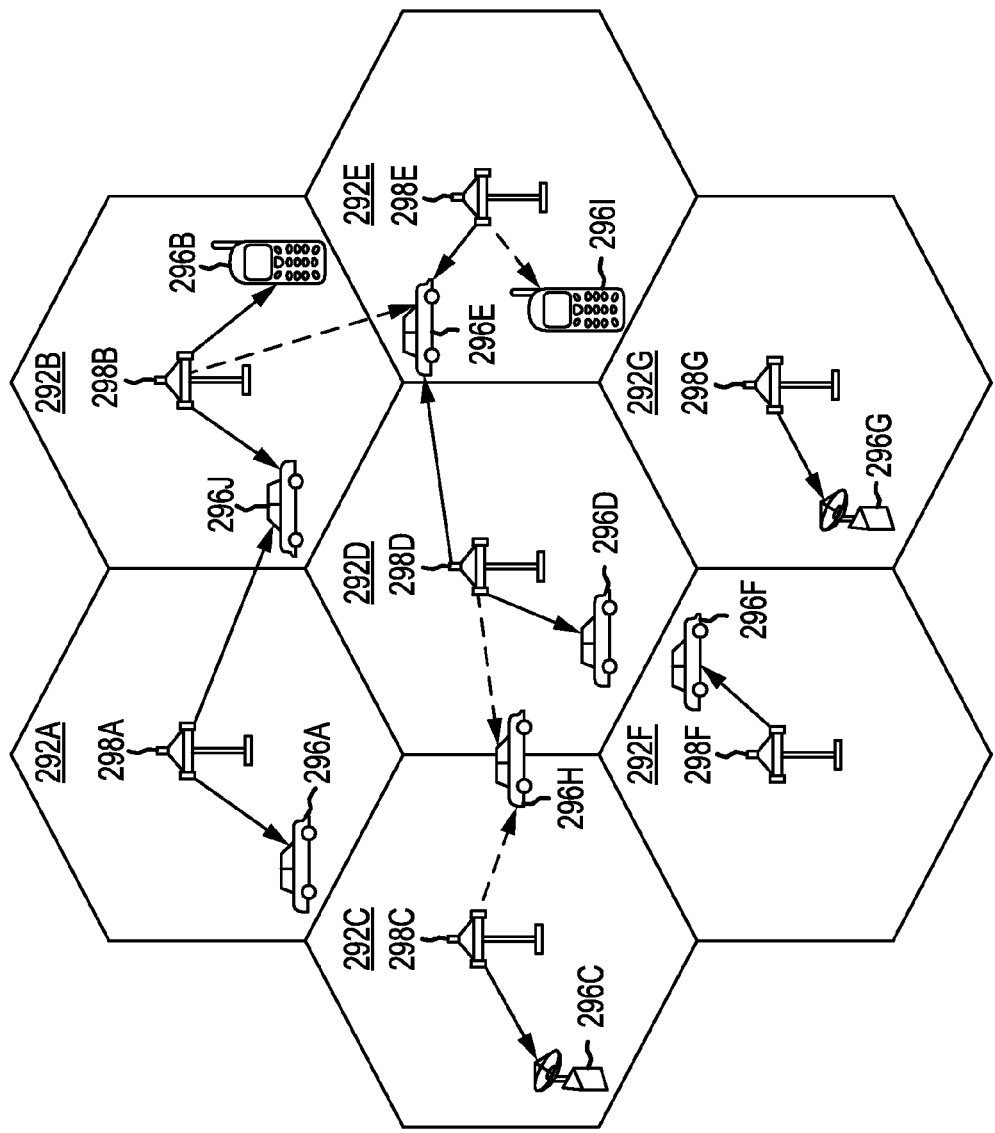
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, when discontinuous transmission (DTX) support for a reverse fundamental channel (R-FCH) is enabled and a 0 bps frame is transmitted on the reverse link, only 200 Hz power control is needed due to the gating pattern. However, the F-PCSCH is still transmitted at 400 bps and only half of the RLPC bits are invalid and ignored by the MS receiver. Thus 50% of the transmitted RLPC bits are wasted during the 0 bps frame transmission. The base transceiver station (BTS) receiver can detect the transmission of the 0 bps frame and then set the F-PCSCH power to zero for users whose reverse link is transmitting at 0 bps.

Figure 3:
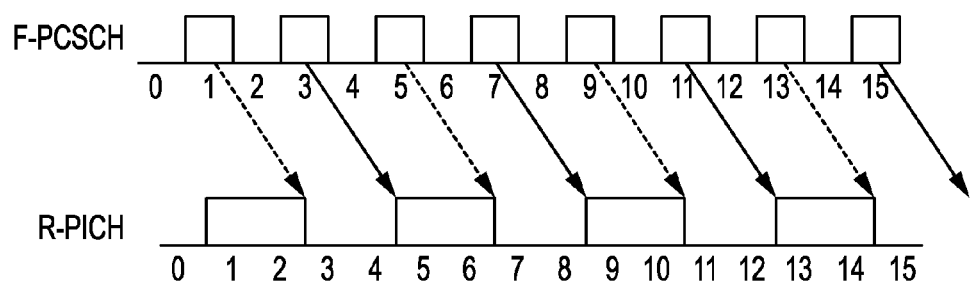
FIG. 3 illustrates an example of an F-PCSCH power gating.

FIG. 3 illustrates an example of an F-PCSCH power gating. In one aspect, a power control group (PCG) consists of 12 power control bit positions and has a rate of 800 Hz. As shown in FIG. 3, by default, the F-PCSCH channel is transmitted during 8 of the 16 PCGs in the forward link. However, as shown by the dotted arrow, half of those RLPC bits are applied to the beginning of a pair of PCGs that are gated off in the reverse link. So they will be automatically discarded by the MS. If the 0 bps frame transmitted on the reverse link is detected, 4 out of the 8 F-PCSCH transmissions can be gated off, which leads to significant saving in forward link transmit power. Specifically, only the $1^{st}$, $3^{rd}$, $5^{th}$ and $7^{th}$ RLPC bits during a frame need to be transmitted.

Disclosed herein are methods for detecting the 0 bps reverse link frames at the base transceiver station (BTS) receiver. Utilizing the gating pattern of the pilot channel is one such method. Since pilot channel is gated, with a 2 PCG ON and 2 PCG OFF pattern, for the 0 bps frame, the BTS receiver can measure the received power difference between the ON PCGs and the OFF PCGs and determine whether a frame is a 0 bps frame or not. One disadvantage of the conventional method is that at the beginning portion of the 0 bps frame, i.e., before the BTS receiver decides that this frame is a 0 bps frame, the BTS still transmits the RLPC bits at 400 Hz. In one aspect, the reliability of this conventional method which uses only the pilot gating pattern is not optimal for some applications.

Another method for transmit power savings for forward link power control subchannel assumes a Markov voice source model. Typically the voice frame types can be reliably modeled as a Markov process. In one aspect, a Markov process is specified by a current state that depends on a finite number of previous states. The 0 bps frames usually show up in a bursty pattern. So, with greater than 95% probability, the frame following a 0 bps frame is a 0 bps frame as well. Thus most of the 0 bps frames can be determined from its beginning with little or no waste of F-PCSCH power.

Figure 4:
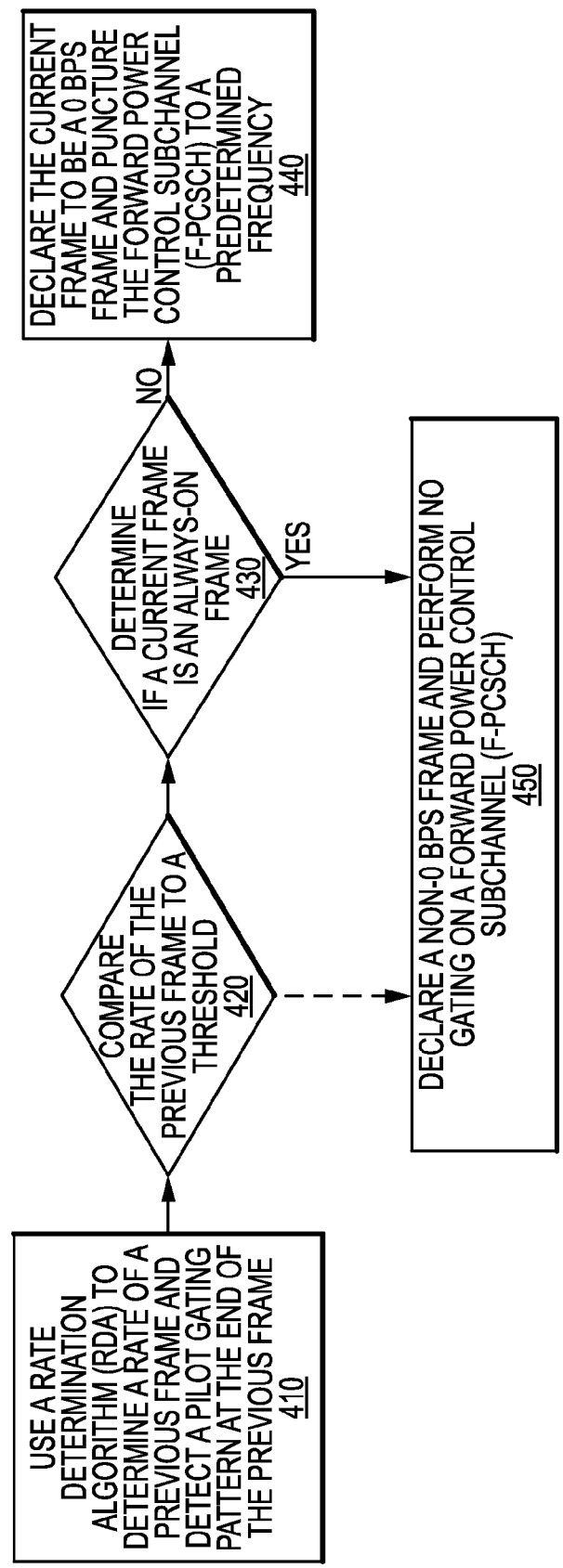
FIG. 4 illustrates an example flow diagram for transmit power savings at a base transceiver station in accordance with the present disclosure.

FIG. 4 illustrates an example flow diagram for transmit power savings at a base transceiver station in accordance with the present disclosure. One skilled in the art would understand that the term base transceiver station may be known by other names, such as but not limited to, base station, Node B, eNodeB, etc. without affecting the spirit or scope of the present disclosure. In block 410, use a rate determination algorithm (RDA) to determine a rate of a previous frame and detect a pilot gating pattern at the end of the previous frame. Following block 410, in block 420, compare the rate of the previous frame to a threshold. In one example, the rate of the previous frame is either a 0 bps or a ⅛-rate frame. In one example, the rate is compared to a threshold wherein one skilled in the art would understand that the threshold value could vary, for example according to application parameters, design parameters, user choice, etc., without affecting the spirit or scope of the present disclosure. In one example, if less than the threshold in block 420, proceed to block 430, and if greater than the threshold in block 420, proceed to block 450.

In block 430, determine if a current frame is an ALWAYS-ON frame. The current frame temporally succeeds the previous frame. If the current frame is an ALWAYS-ON frame, proceed to block 450. In one aspect, an ALWAYS-ON frame is not a 0 bps frame. In one example, one out of every N frames is an ALWAYS-ON frame. In one example, the default value for N is 4 and the value may be changed via a signaling message to the mobile station. In block 450, declare a non-0 bps frame and perform no gating on a forward power control subchannel (F-PCSCH). In one example, the declaring a non-0 bps frame and performing no gating on a forward power control subchannel (F-PCSCH) is temporary. One skilled in the art would understand that the duration of the temporary state can be varied and determined according to various parameters, such as application parameters, design parameters or user choice, etc., without affecting the spirit or scope of the present disclosure.

If the current frame is not an ALWAYS-ON frame, proceed to block 440. In block 440, declare the current frame to be a 0 bps frame and puncture the forward power control subchannel (F-PCSCH) to a predetermined frequency. In one example, the pre-determined frequency is 200 Hz. And, in one example, transmit every other reverse link power control (RLPC) bits, such as, $1^{st}$, $3^{rd}$, $5^{th}$ and $7^{th}$ RLPC bits. In one example, temporarily declare the current frame is to be the 0 bps frame and puncture the forward power control subchannel (F-PCSCH) to the predetermined frequency. One skilled in the art would understand that the duration of the temporary state can be varied and determined according to various parameters, such as application parameters, design parameters or user choice, etc., without affecting the spirit or scope of the present disclosure.

Figure 5:
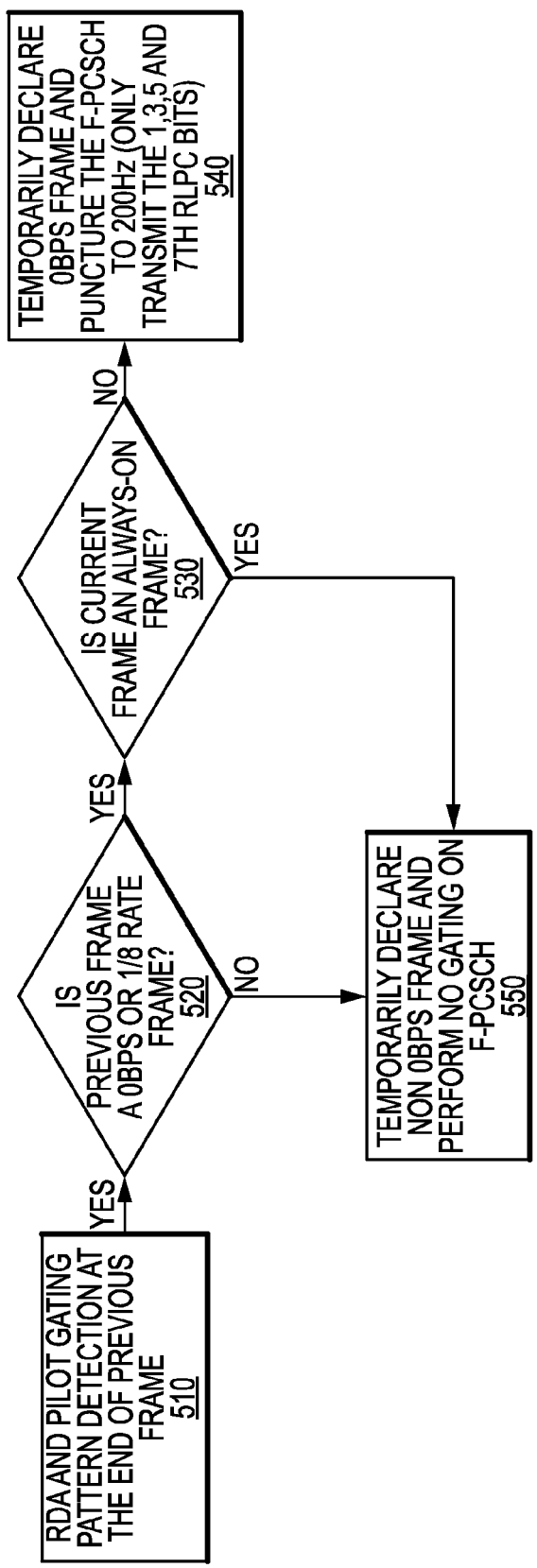
FIG. 5 illustrates an example flow diagram of a base transceiver station (BTS) procedure to detect frame type.

FIG. 5 illustrates an example flow diagram of a base transceiver station (BTS) procedure to detect frame type. The flow diagram of FIG. 5 is a particular example of the flow diagram of FIG. 4. In block 510, use a rate determination algorithm (RDA) to determine a rate and detect a pilot gating pattern at the end of the previous frame. If yes, proceed to block 520. In block 520, determine if the previous frame is a 0 bps or ⅛-rate frame. If yes, proceed to block 530 and determine if the current frame is an ALWAYS-ON frame. If the current frame is not an ALWAYS-ON frame, proceed to block 540. In block 540, temporarily declare 0 bps frame and puncture the F-PCSCH to 200 Hz (only transmit the 1, 3, 5 and $7^{th}$ RLPC bits). Following block 520, if the previous frame is not a 0 bps or ⅛-rate frame, proceed to block 550. Following block 530, if the current frame is an ALWAYS-ON frame, proceed to block 550. In block 550, temporarily declare a non 0 bps frame and perform no gating on F-PCSCH.

At the base station, the BTS receiver determines received frame types (0 bps frame or non-0 bps frame) by combining the outcomes of the rate determination algorithm (RDA) and pilot gating pattern detection. However, this decision is not available until late into the frame reception. At the beginning of each frame, a temporary decision solely based on the knowledge of the previous frame is made. For example, a frame following a 0 bps frame or a ⅛-rate frame is temporarily determined to be 0 bps frame, unless it falls on the ALWAYS-ON frame boundary. Based on the temporary decision. F-PCSCH gating is enabled/disabled.

One feature as a result of the Markov model based 0 bps frame detection algorithm is that when a non-0 bps frame follows a 0 bps frame, this non-0 bps frame may be temporarily and incorrectly determined as a 0 bps frame. Thus, the F-PCSCH will be gated down to 200 Hz, which causes power control degradation of the non-0 bps frame. In order to for the mobile station (MS) to avoid attempting to demodulate the F-PCSCH when it is actually gated off, a MS procedure for overcoming BTS frame mistakes is followed.

Figure 6:
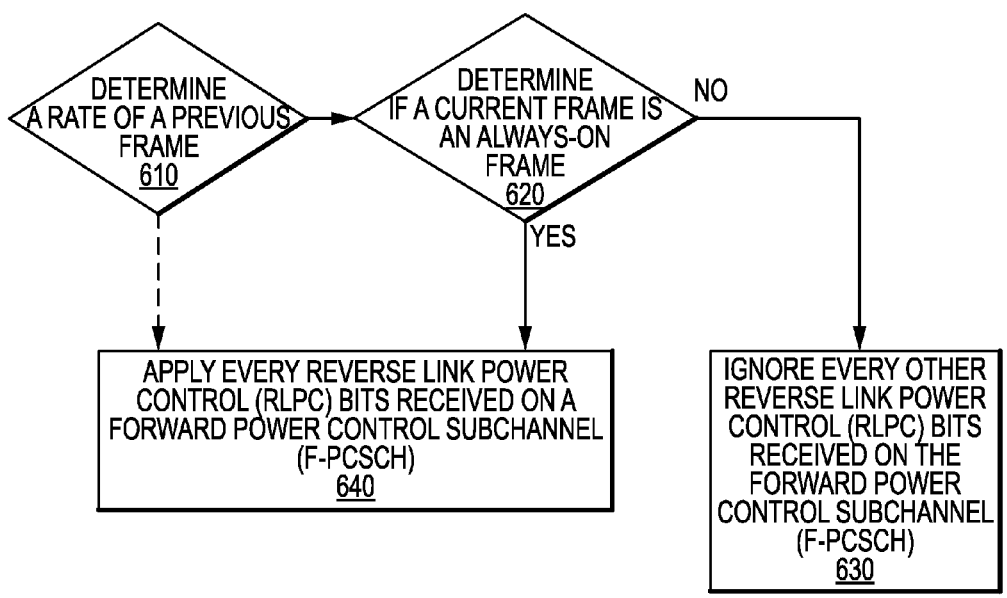
FIG. 6 illustrates an example flow diagram for transmit power savings at a mobile station in accordance with the present disclosure.

FIG. 6 illustrates an example flow diagram for transmit power savings at a mobile station (MS). One skilled in the art would understand that the term mobile station may be known by other names, such as but not limited to, mobile terminal, user device, wireless device, etc. without affecting the spirit or scope of the present disclosure. In block 610, determine a rate of a previous frame. In one example, the rate of the previous frame is either 0 bps or ⅛-rate frame. In one example, the rate is compared to a threshold. One skilled in the art would understand that the threshold value may vary (for example, in accordance to design parameters, application parameters or user choice, etc.) without affecting the spirit or scope of the present disclosure.

Following block 610, in block 620, determine if a current frame is an ALWAYS-ON frame. The current frame temporally succeeds the previous frame. If the current frame is an ALWAYS-ON frame, proceed to block 640. In block 640, apply every reverse link power control (RLPC) bits received on a forward power control subchannel (F-PCSCH). In one example, in block 610, if the rate of the previous frame is not either 0 bps or ⅛-rate frame, the step in block 640 is performed. If the current frame is not an ALWAYS-ON frame, proceed to block 630. In block 630, ignore every other reverse link power control (RLPC) bits received on the forward power control subchannel (F-PCSCH). In one example, the bits being ignored are the $0^{th}$, $2^{nd}$, $4^{th}$ and $6^{th}$ RLPC bits.

Figure 7:
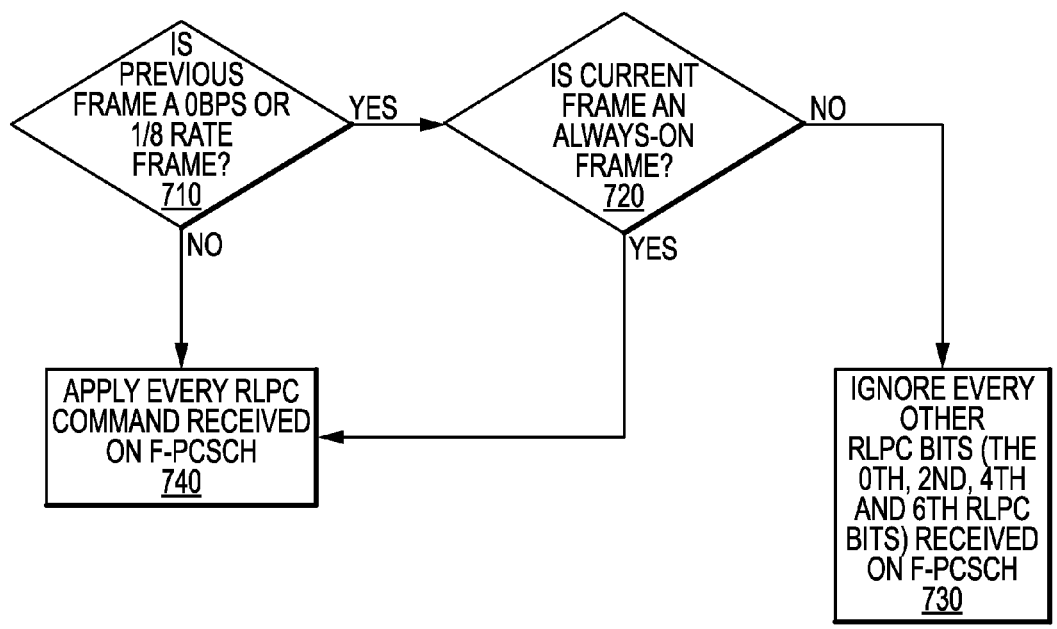
FIG. 7 illustrates an example flow diagram of a mobile station (MS) procedure for overcoming base transceiver station (BTS) frame mistakes.

FIG. 7 illustrates an example flow diagram of a mobile station (MS) procedure for overcoming base transceiver station (BTS) frame mistakes. The flow diagram of FIG. 7 is a particular example of the flow diagram of FIG. 6. In block 710, determine if the previous frame is a 0 bps or ⅛-rate frame. If no, proceed to block 740. If yes, proceed to block 720 and determine if the current frame is an ALWAYS-ON frame. If the current frame is an ALWAYS-ON frame, proceed to block 740. In block 740, apply every RLPC command received on F-PCSCH. If the current frame is not an ALWAYS-ON frame, proceed to block 730. In block 730, ignore every other RLPC bits (e.g., the $0^{th}$, $2^{nd}$, $4^{th}$ and $6^{th}$ RLPC bits) received on F-PCSCH.

The MS knows the frame types it transmits. If the Markov model based 0 bps frame detection carried out by the BTS receiver is known apriori to the MS, the MS knows when the BTS will make a mistake by treating a non-0 bps frame as a 0 bps frame. In this case, the MS ignores every other RLPC bit demodulated on the F-PCSCH. Specifically, for example, the $0^{th}$, $2^{nd}$, $4^{th}$ and $6^{th}$ RLPC bits received during the frame is ignored by the MS.

One skilled in the art would understand that the steps disclosed in the example flow diagrams in FIGS. 4, 5, 6 and 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
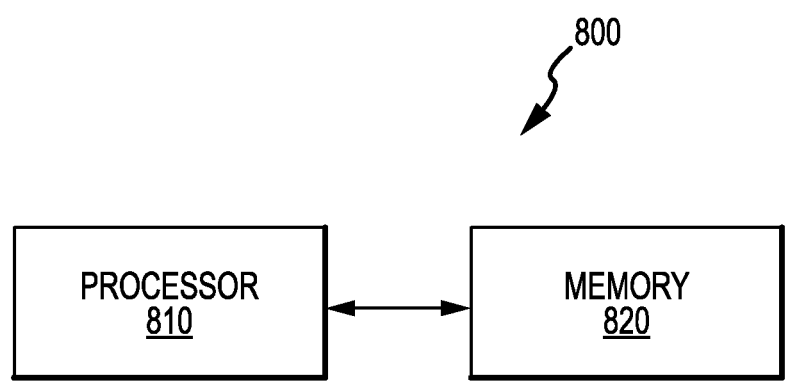
FIG. 8 illustrates an example device comprising a processor in communication with a memory for executing the processes of transmit power savings.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example device 800 comprising a processor 810 in communication with a memory 820 for executing the processes of transmit power savings. In one example, the device 800 is used to implement the algorithms illustrated in FIGS. 4, 5, 6 and 7. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
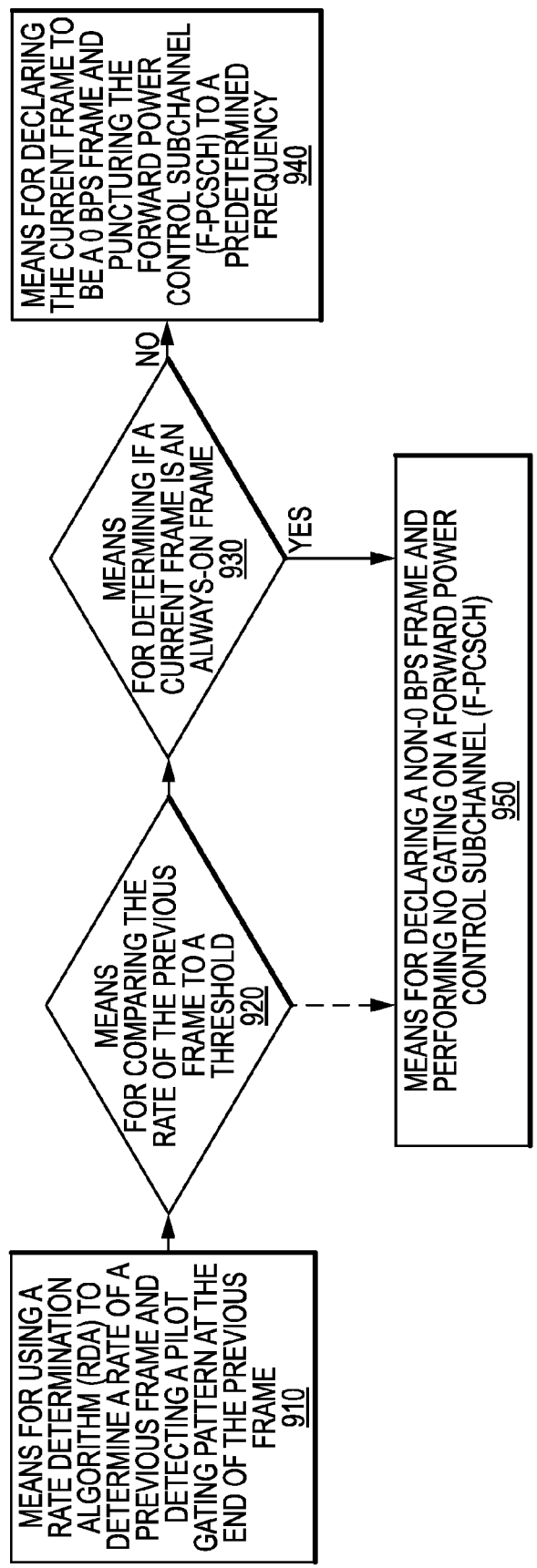
FIG. 9 illustrates an example device 900 suitable for transmit power savings at a base transceiver station.

FIG. 9 illustrates an example device 900 suitable for transmit power savings at a base transceiver station. In one aspect, the device 900 is implemented by at least one processor comprising one or more modules configured to provide different aspects of transmit power savings as described herein in blocks 910, 920, 930, 940 and 950. For example, each module comprises hardware, firmware, software, or any combination thereof. In one aspect, the device 900 is also implemented by at least one memory in communication with the at least one processor.

Figure 10:
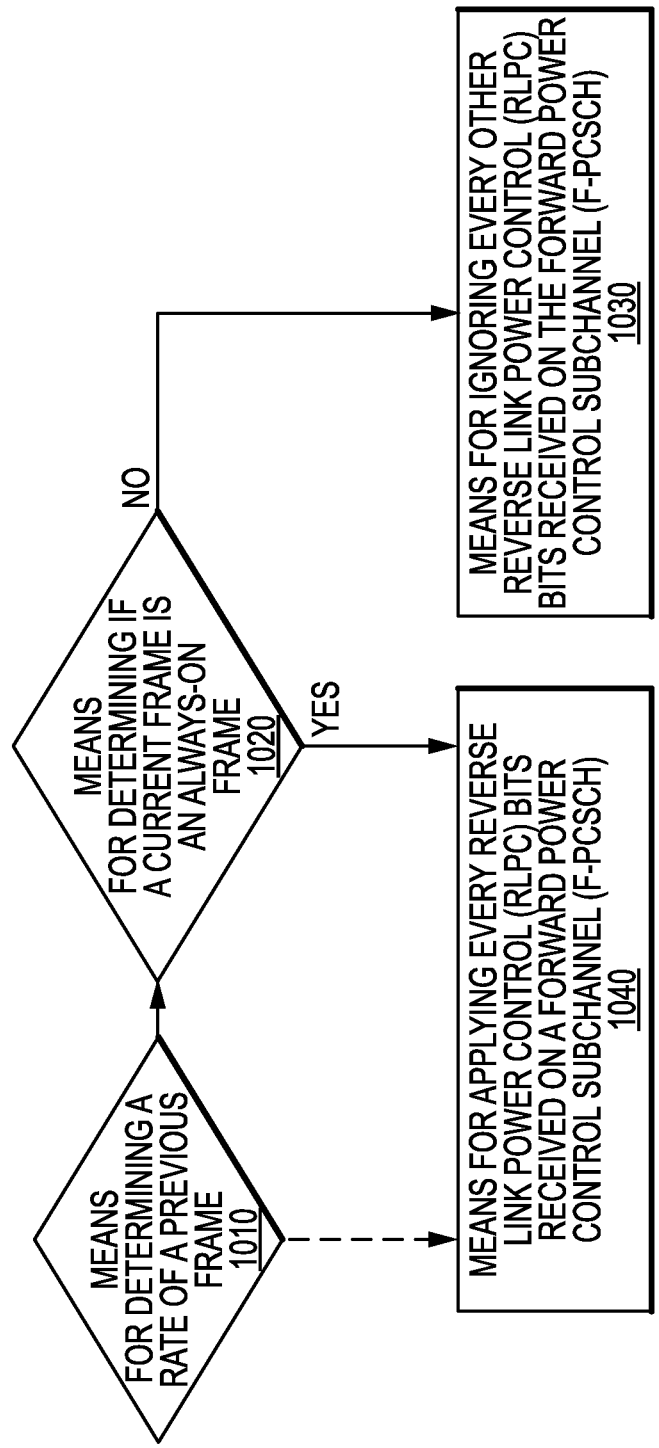
FIG. 10 illustrates an example device suitable for transmit power savings at a mobile station.

FIG. 10 illustrates an example device 1000 suitable for transmit power savings at a mobile station. In one aspect, the device 1000 is implemented by at least one processor comprising one or more modules configured to provide different aspects of transmit power savings as described herein in blocks 1010, 1020, 1030 and 1040. For example, each module comprises hardware, firmware, software, or any combination thereof. In one aspect, the device 1000 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for facilitating base station transmit power savings comprising:
   determining a rate of a previous frame;
   determining if a current frame is an ALWAYS-ON frame in response to a determination that the rate of the previous frame is below a threshold, wherein the current frame temporally succeeds the previous frame; and
   ignoring every other set of reverse link power control (RLPC) bits received on a forward power control subchannel (F-PCSCH) based on the determination that the rate of the previous frame is below the threshold and a determination that the current frame is not an ALWAYS-ON frame.

2. The method of claim 1, wherein the previous frame comprises at least one of a 0 bits per second (bps) frame or a ⅛-rate frame.

3. The method of claim 2, wherein the ignored RLPC bits comprise a 0th, 2nd, 4th and 6th set of RLPC bits of the current frame.

4. A method for transmit power savings at a base transceiver station comprising:
   using a rate determination algorithm (RDA) to determine a rate of a previous frame;
   detecting a pilot gating pattern at the end of the previous frame;
   determining if a current frame is an ALWAYS-ON frame; and
   classifying the current frame as a 0 bits per second (bps) frame and puncturing a forward power control subchannel (F-PCSCH) associated with the base transceiver station according to a predetermined frequency in response to the pilot gating pattern at the end of the previous frame, a determination that the rate of the previous frame is below a threshold, and a determination that the current frame is not an ALWAYS-ON frame.

5. The method of claim 4, wherein the previous frame comprises at least one of a 0 bps or a ⅛-rate frame.

6. The method of claim 5, wherein the pre-determined frequency is 200 Hz.

7. The method of claim 4, further comprising:
   generating a plurality of sets of reverse link power control (RLPC) bits associated with the current frame for transmission over the F-PCSCH;
   wherein the puncturing the F-PCSCH comprises transmitting every other set of the generated reverse link power control (RLPC) bits.

8. The method of claim 7, wherein the every other set of the generated reverse link power control (RLPC) bits include a 1st, 3rd, 5th and 7th set of the RLPC bits.

9. The method of claim 4, further comprising classifying the current frame as a non-0 bps frame and inhibiting gating on the forward power control subchannel (F-PCSCH).

10. An apparatus for facilitating base station transmit power savings comprising a processor and a memory, the memory containing program code executable by the processor for performing the following:
    determining a rate of a previous frame;
    determining if a current frame is an ALWAYS-ON frame in response to a determination that the rate of the previous frame is below a threshold, wherein the current frame temporally succeeds the previous frame; and
    ignoring every other set of reverse link power control (RLPC) bits received on a forward power control subchannel (F-PCSCH) based on the determination that the rate of the previous frame is below the threshold and a determination that the current frame is not an ALWAYS-ON frame.

11. The apparatus of claim 10, wherein the previous frame comprises at least one of a 0 bits per second (bps) frame or a ⅛-rate frame.

12. The apparatus of claim 11, wherein the ignored RLPC bits comprise a 0th, 2nd, 4th and 6th set of RLPC bits of the current frame.

13. A base transceiver station for transmit power savings comprising a processor and a memory, the memory containing program code executable by the processor for performing the following:
    using a rate determination algorithm (RDA) to determine a rate of a previous frame;
    detecting a pilot gating pattern at the end of the previous frame;
    determining if a current frame is an ALWAYS-ON frame; and
    classifying the current frame as a 0 bits per second (bps) frame and puncturing a forward power control subchannel (F-PCSCH) associated with the base transceiver station according to a predetermined frequency in response to the pilot gating pattern at the end of the previous frame, a determination that the rate of the previous frame is below a threshold, and a determination that the current frame is not an ALWAYS-ON frame.

14. The base transceiver station of claim 13, wherein the previous frame comprises at least one of a 0 bps or a ⅛-rate frame.

15. The base transceiver station of claim 14, wherein the pre-determined frequency is 200 Hz.

16. The base transceiver station of claim 13, wherein the memory further comprising program code for:
    generating a plurality of sets of reverse link power control (RLPC) bits associated with the current frame for transmission over the F-PCSCH;
    wherein the puncturing the F-PCSCH comprises transmitting every other set of the generated reverse link power control (RLPC) bits.

17. The base transceiver station of claim 16, wherein the every other set of the generated reverse link power control (RLPC) bits include a 1st, 3rd, 5th and 7th set of the RLPC bits.

18. The base transceiver station of claim 13, wherein the memory further comprising program code for:
    classifying the current frame as a non-0 bps frame and inhibiting gating on the forward power control subchannel (F-PCSCH).

19. The base transceiver station of claim 13 further comprising means for classifying the current frame as a non-0 bps frame and inhibiting gating on the forward power control subchannel (F-PCSCH).

20. An apparatus for facilitating base station transmit power savings comprising:
    means for determining a rate of a previous frame;
    means for determining if a current frame is an ALWAYS-ON frame in response to a determination that the rate of the previous frame is below a threshold, wherein the current frame temporally succeeds the previous frame; and means for ignoring every other set of reverse link power control (RLPC) bits received on a forward power control subchannel (F-PCSCH) based on the determination that the rate of the previous frame is below the threshold and a determination that the current frame is not an ALWAYS-ON frame.

21. The apparatus of claim 20, wherein the previous frame comprises at least one of a 0 bits per second (bps) frame or a ⅛-rate frame.

22. The apparatus of claim 21, wherein the ignored RLPC bits comprise a 0th, 2nd, 4th and 6th set of RLPC bits of the current frame.

23. A base transceiver station for transmit power savings comprising:

means for using a rate determination algorithm (RDA) to determine a rate of a previous frame;

means for detecting a pilot gating pattern at the end of the previous frame;

means for determining if a current frame is an ALWAYS-ON frame; and means for classifying the current frame as a 0 bits per second (bps) frame and puncturing a forward power control subchannel (F-PCSCH) associated with the base transceiver station according to a predetermined frequency in response to the pilot gating pattern at the end of the previous frame, a determination that the rate of the previous frame is below a threshold, and a determination that the current frame is not an ALWAYS-ON frame.

24. The base transceiver station of claim 23, wherein the previous frame comprises at least one of a 0 bps or a ⅛-rate frame.

25. The base transceiver station of claim 24, wherein the pre-determined frequency is 200 Hz.

26. The base transceiver station of claim 23, further comprising:

means for generating a plurality of sets of reverse link power control (RLPC) bits associated with the current frame for transmission over the F-PCSCH;

wherein the means for puncturing the F-PCSCH comprises means for transmitting every other set of the generated reverse link power control (RLPC) bits.

27. The base transceiver station of claim 26, wherein the every other set of the generated reverse link power control (RLPC) bits include a 1st, 3rd, 5th and 7th set of the RLPC bits.

28. A computer-readable storage device storing a computer program, wherein execution of the computer program is causes at least one processor to:

determine a rate of a previous frame;

if a current frame is an ALWAYS-ON frame in response to a determination that the rate of the previous frame is below a threshold, wherein the current frame temporally succeeds the previous frame; and ignore every other set of reverse link power control (RLPC) bits received on a forward power control subchannel (F-PCSCH) based on the determination that the rate of the previous frame is below the threshold and a determination that the current frame is not an ALWAYS-ON frame.

29. A computer-readable storage device storing a computer program, wherein execution of the computer program is causes at least one processor to:

use a rate determination algorithm (RDA) to determine a rate of a previous frame;

detect a pilot gating pattern at the end of the previous frame;

determine if a current frame is an ALWAYS-ON frame; and classify the current frame as a 0 bits per second (bps) frame and puncturing a forward power control subchannel (F-PCSCH) associated with the base transceiver station according to a predetermined frequency in response to the pilot gating pattern at the end of the previous frame, a determination that the rate of the previous frame is below a threshold, and a determination that the current frame is not an ALWAYS-ON frame.

* * * * *